(12) United States Patent
Gammelgaard

(10) Patent No.: US 12,360,440 B2
(45) Date of Patent: *Jul. 15, 2025

(54) CAMERA CASING

(71) Applicant: Tyler Gammelgaard, Chaska, MN (US)

(72) Inventor: Tyler Gammelgaard, Chaska, MN (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/960,554

(22) Filed: Oct. 5, 2022

(65) Prior Publication Data

US 2023/0025431 A1 Jan. 26, 2023

Related U.S. Application Data

(63) Continuation-in-part of application No. 17/140,320, filed on Jan. 4, 2021, now Pat. No. 11,493,830.

(60) Provisional application No. 62/957,217, filed on Jan. 5, 2020.

(51) Int. Cl.
  *G03B 17/56* (2021.01)
  *G03B 17/55* (2021.01)

(52) U.S. Cl.
  CPC ............. *G03B 17/56* (2013.01); *G03B 17/55* (2013.01)

(58) Field of Classification Search
  CPC ........ G03B 17/00; G03B 17/02; G03B 17/04; G03B 17/08; G03B 17/561; G03B 2215/0542; A45C 11/38
  See application file for complete search history.

(56) References Cited

U.S. PATENT DOCUMENTS

| | | | |
|---|---|---|---|
| 1,535,312 A | 4/1925 | Hosking | |
| 4,176,701 A | 12/1979 | Welgan | |
| 4,751,950 A | 6/1988 | Bock | |
| 4,927,017 A | 5/1990 | Easter | |
| 5,173,585 A | 12/1992 | Dokken | |
| 9,442,304 B2 | 9/2016 | Evans | |
| 11,493,830 B2 * | 11/2022 | Gammelgaard | ....... G03B 17/56 |
| 2004/0251151 A1 | 12/2004 | Doran, Jr. | |
| 2006/0283737 A1 | 12/2006 | Hassett | |
| 2007/0269194 A1 | 11/2007 | Doran, Jr. | |
| 2011/0097069 A1 | 4/2011 | Braithwaite | |

(Continued)

OTHER PUBLICATIONS

Delkin DDSPROC400D-B Snug-It Pro Camera Skin for Canon Reble Xti, retrieved on Jun. 8, 2024 <URL:https://www.amazon.com/dp/B.B1935YM9/ref=sspa_dk_hqp_detail_aax_0?sp_csd=d2lkZ2V0TmFtZT1zcF9ocXBfc2hhcmVk&th=1> Jun. 2003.*

(Continued)

*Primary Examiner* — Christopher E Mahoney
(74) *Attorney, Agent, or Firm* — Westman, Champlin & Koehler, P.A.; Z. Peter Sawicki

(57) ABSTRACT

A camera casing having at least one front face. The at least one front face has a first opening, the front face being configured to securely fit with a camera, a flexible covering attached to a perimeter of the front face and the flexible covering having a service opening to provide access to an interior of the camera casing. A first retaining member may be incorporated into the flexible covering and configured to secure the camera to the front face; the front face is a rigid or a semi-rigid material; the front face has one or more 3D features to correspond to one or more features of the camera for positioning the camera within the camera casing; or combinations thereof.

17 Claims, 14 Drawing Sheets

(56) References Cited

U.S. PATENT DOCUMENTS

| | | |
|---|---|---|
| 2015/0177532 A1 | 6/2015 | Evans |
| 2016/0018718 A1 | 1/2016 | Jones |
| 2021/0093058 A1 | 4/2021 | Druker et al. |

OTHER PUBLICATIONS

"Built in DVR Teddy Bear Nanny Camera W/ 90 Day Battery", CustomWiFiSpyCameras.com <https://www.customwifispycameras.com/xtreme-life-720p-teddy-bear-hidden-nanny-spy-camera-w-720p-hd-camera-and-90-day-battery/>, retrieved during Internet search conducted Aug. 27, 2020.

"Delkin Devices Snug-It Pro Skin Camera Protector for the Canon EOS 7D" B&H <https://www.bhphotovideo.com/c/product/671372-REG/Delkin_Devices_DDSPROC7D_B_Snug_It_Pro_Skin.html>, retrieved during Internet search conducted Aug. 27, 2020.

"Zooby kin Car Baby Monitor—Finley Fox" infanttech <https://infanttech.com/products/fox-zooby-kin-car-baby-monitor>, retrieved during Internet search conducted Aug. 27, 2020.

"Camera Parka Classic" AT Frosted Lens <https://atfrostedlens.com/storecpc/>, retrieved during Internet search conducted Aug. 27, 2020.

"Silicone Protective Case Skin Cover Camera Accessories for GoPro Fusion 360 Camera 8 Colors" Banggood <https://www.banggood.com/Silicone-Protective-Case-Skin-Cover-Camera-Accessories-for-GoPro-Fusion-360-Camera-8-Colors-p-1238129.html>, retrieved during Internet search conducted Aug. 27, 2020.

Examination Report issued for related CA application serial No. 3104816, dated Mar. 11, 2022.

Ruggard DSRL Parka Cold and Rain Protector for Cameras and Camcorders (Black), https://www.amazon.com/Ruggard-Parka-Protector-Cameras-Camcorders/dp/B01GSIHWPI Jun. 8, 2016 (Year: 2016).

* cited by examiner

| Experiment | Without Casing (Average) | With Casing (Average) |
|---|---|---|
| 1 - 610 | 35 min | 83 min |
| 2 - 620 | 38 min | 85 min |
| 3 - 630 | 49 min | 86 min |
| 4 - 640 | 34 min | 70 min |

FIG. 6

CAMERA CASING

CROSS-REFERENCE TO RELATED APPLICATIONS

This application is a continuation-in-part of U.S. patent application Ser. No. 17/140,320, filed on Jan. 2, 2021, which claims priority to and the benefit of U.S. provisional patent application Ser. No. 62/957,217, filed on Jan. 5, 2020, the contents of which are incorporated herein in their entirety.

BACKGROUND

Various aspects of this disclosure relate generally to a casing for a camera, particularly, a low temperature casing.

Cameras generate their own heat with high shutter speed and resolution settings. However, when exposed to external elements such as cold temperatures, wind or other weather forces, the heat is dissipated into the external environment. The dissipation of heat into the environment decreases the performance of the camera, including, but not limited to, that of battery life.

The present description illustrates a casing that improves the insulation of the camera from cold external temperature, wind and/or weather and reduces the rate at which generated heat is dissipated into the external environment while allowing a user to record and/or take photos of the external environment from within the casing.

SUMMARY

An aspect of the present disclosure relates to a camera casing comprises at least one front face. The at least one front face comprises a first opening, the front face being configured to securely fit with a camera, a flexible covering attached to a perimeter of the front face, the flexible covering having a service opening to provide access to an interior of the camera casing; and at least a first retaining member incorporated into the flexible covering, the first retaining member configured to secure the camera to the front face.

The first retaining member is secured at a first location and a second location spaced there apart and on the front face, the first retaining member configured to hold the camera in a position relative to the front face.

A second retaining member is incorporated in the flexible covering, wherein the second retaining member is configured to hold at least one additional accessory. The at least one additional accessory is a heating element or a cooling element.

The second retaining member is configured as a pocket or pouch incorporated within or affixed to the flexible covering. The second retaining member further comprises a closure configured to partially or completely close the second retaining member enclosing the at least one additional accessory within.

The flexible covering comprises one or more layers of flexible material.

The first retaining member is incorporated within the cover between the one or more layers of flexible material.

The material of the front face is different from a material of the flexible covering. The material of the front face is comprised of a rigid or a semi-rigid material.

Another aspect of the present disclosure relates to a camera casing with at least one front face comprising a first opening, the front face being configured to securely fit with a camera, a flexible covering attached to a perimeter of the front face, the flexible covering having a service opening to provide access to an interior of the camera casing; and wherein the front face comprises a rigid or semi-rigid material and wherein the front face comprises one or more 3D features to correspond to one or more features of the camera for positioning the camera within the camera casing.

The front face is a molded front face with the one or more 3D features corresponding to the features of the camera for positioning the camera within the camera casing or providing an improved fit with the camera.

The front face further comprises one or more secondary openings, wherein the one or more secondary openings are configured to align with one or more additional features of the camera.

One or both of the front face and flexible covering are constructed from materials having improved thermal properties allowing for retaining heat, insulating the camera, or reducing heat transfer to or from the interior of the camera casing.

Yet another aspect of the present disclosure relates to a camera casing comprising at least one front face comprising a first opening, the front face being configured to securely fit with a camera, a flexible covering attached to a perimeter of the front face, the flexible covering having a service opening to provide access to an interior of the camera casing; at least a first retaining member arranged in the interior of the camera casing, the first retaining member configured to secure the camera to the front face; and wherein a material of the front face is different from a material of the flexible covering and wherein one or both of the front face and the flexible covering are comprised of a material having thermal properties allowing for retaining heat within the camera casing or insulating the interior of the camera casing from an external environment.

A second retaining member is incorporated in the flexible covering, wherein the second retaining member is configured to hold at least one additional accessory.

The second retaining member is configured as a pocket or pouch incorporated within or affixed to the flexible covering.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows a performance comparison chart of battery lifetime.

DETAILED DESCRIPTION

The following detailed description refers to the accompanying drawings that show, by way of illustration, specific details and embodiments in which the invention may be practiced.

The described invention provides insulation from cold weather elements along with improving protection from damage to the camera, by way of non-limiting example, for scratching on the front surface, or improved impact resistance.

Figure 1A:
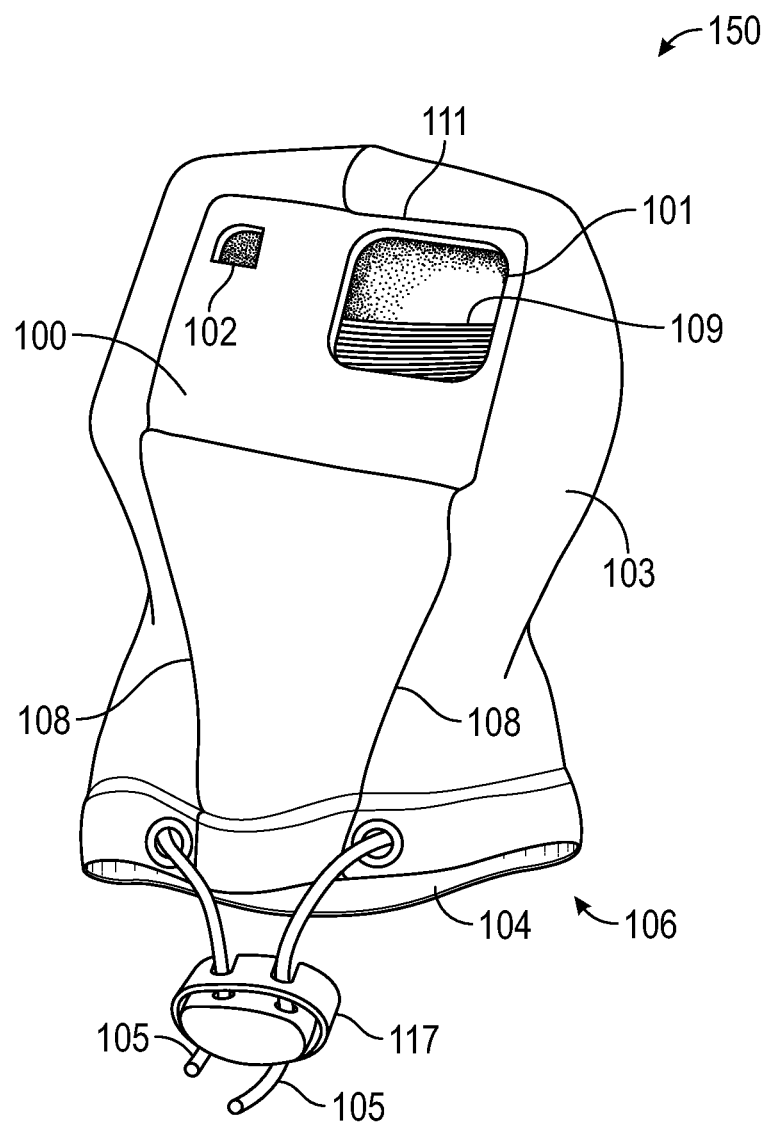
FIG. 1A shows a front perspective view of an embodiment of a casing.

FIG. 1A provides a perspective view of an embodiment of a casing 150 for a camera 130 (illustrated in FIG. 1F) having a front face 100 and a covering 103, covering 103 having at least one service opening 104 to provide access to an interior 120 (illustrated in FIGS. 1C and 1D) of casing 150 for inserting at least camera 130 into casing 150.

The material of front face 100, shown in FIG. 1A to be rectangular, may be configured as rigid, semi-rigid or flexible. In some embodiments, front face 100 is made from a closed foam, such as Ethylene-Vinyl Acetate (EVA), or an open cell foam. In other embodiments, front face 100 may be configured as clear or transparent for easier viewing. In an embodiment, front face 100 is molded, shaped, or formed into a three-dimensional shape to have an improved fit with camera 130 where the features of camera 130 correspond to the three-dimensional shape of front face 100. This allows for easier positioning of camera 130, and a better fit of camera 130 with front face 100 reducing the chance that the front face 100 or covering 103 might inadvertently get into the field of view of the camera 130. The front face 100 may act as a barrier to wind and other elements and improve cold weather resistance of the casing 150 by further insulating the camera 130. Alternatively, in a separate embodiment, front face 100 is configured to be a flat surface such that front face 100 is not a molded surface. This embodiment allows for economical modification and production during the manufacturing process.

Although front face 100 is illustrated to be rectangular in FIG. 1A, the shape of front face 100 may be presented in many different conventional forms, sizes, shapes and designs. Front face 100 may be in a shape to fit a front of camera 130 or front face 100 may be larger or smaller than the front of camera 130. Further, front face 100 may be square, rectangular, circular, oval shaped or a variety of other available shapes.

Front face 100 includes at least one opening or window, such as first opening 101, to align with a feature of camera 130, or for the feature of camera 130 to fit through. Such feature may be a lens 140 (illustrated in FIG. 1F) of camera 130. First opening 101 may be arranged in any location on front face 100. In an alternative embodiment, first opening 101 is large enough to provide access to a plurality of controls and displays on the front of camera 130, and not only lens 140. By way of a non-limiting example, lens 140 along with a display of camera 130 may be viewed through first opening 101. First opening 101 may be of various sizes and shapes that allow lens 140 of camera 130 to fit through it or align with it. In the embodiment illustrated in FIG. 1A, first opening 101, i.e. lens window, is presented as a rectangular opening or space in front face 100.

Additionally, front face 100 may have other openings, such as a second opening 102, provided to allow for accessibility and visibility to lights, displays, buttons and other controls on camera 130 from outside casing 150. In an embodiment, second opening 102 is configured as a display window, shown in FIG. 1A as another opening or space in the upper left-hand corner of front face 100. However, second opening 102 may be arranged in any location on front face 100. Front face 100 offers a fit with camera 130 or lens 140 that locates the feature on camera 130, this allows other openings, such as second opening 102, to properly align with various displays, controls, and features on front, top, bottom, back or sides of camera 130 as well as helps hold camera 130 in place on front face 100 when it is jostled. Although only two openings are illustrated, there may be further openings on front face 100 to accommodate other features on camera 130.

Camera 130 may be presented in many different conventional forms, sizes, shapes and designs. Casing 150 and its various features can be designed to fit just one type of camera or many different types.

Covering 103, optionally made from a separate material than that of front face 100, is attached around a perimeter 111 of front face 100. Covering 103 is made from a single piece or multiple layers of a flexible material. Covering 103, in combination with front face 100, acts as a housing, or casing 150, for camera 130. The material of covering 103 and/or front face 100 may be made from materials having improved thermal properties for thermal protection of the camera 130. The materials of covering 103 may have improved thermal properties providing insulation for the camera 130 from external hot or cold temperatures, or for retaining or dissipating heat from the covering 103 and/or from the casing 150. The covering 103 may be constructed from one or more layers of materials that collectively have improved thermal properties. By way of a non-limiting example, the covering 103 may have a nylon outer layer, a metalized reflective internal layer, a closed cell foam internal layer, and a polyester inner layer. Additionally or alternatively, the covering 103 may have a Mylar® layer, or any number of other materials and/or combinations of materials capable of providing improved thermal properties. Additionally, or alternatively, the material of covering 103 and/or front face 100 may be made from materials having water resistance or a closed cell foam material such as neoprene.

In the embodiment illustrated in FIG. 1A, covering 103 includes service opening 104. Although service opening 104 is illustrated to be located at a base 106 of covering 103, it may be located anywhere on covering 103. Service opening 104 is used to access interior 120 (shown in FIGS. 1C and 1D) of casing 150 for inserting camera 130 and/or one or more additional accessories 131 (illustrated in FIG. 1F). Interior 120 of covering 103 may be accessed with an access mechanism 107 (shown in FIG. 1B), such as a zipper arranged on covering 103, or alternatively, covering 103 is stretched such that casing 150 may even be flipped inside out, offering improved accessibility to camera 130 that is inside casing 150.

Optionally, as illustrated in FIG. 1A, at least one closure 105 is provided in covering 103 around the perimeter of service opening 104 to allow for the closing of the service opening 104. Closure 105 may be embodied as drawstrings, elastic gather, zippered flap, zipper, button straps, buttons or any one of a wide variety of other features or methods that can partially or completely close service opening 104. Inclusion of closure 105 provides further security for camera 130 within casing 150.

In a further embodiment, a locking mechanism 117, such as a cord lock, may be provided on closure 105 in order to prevent service opening 104 from inadvertently opening, providing further protection for camera 130 and/or one or more additional accessories 131 arranged in covering 103 through service opening 104.

Figure 1B:
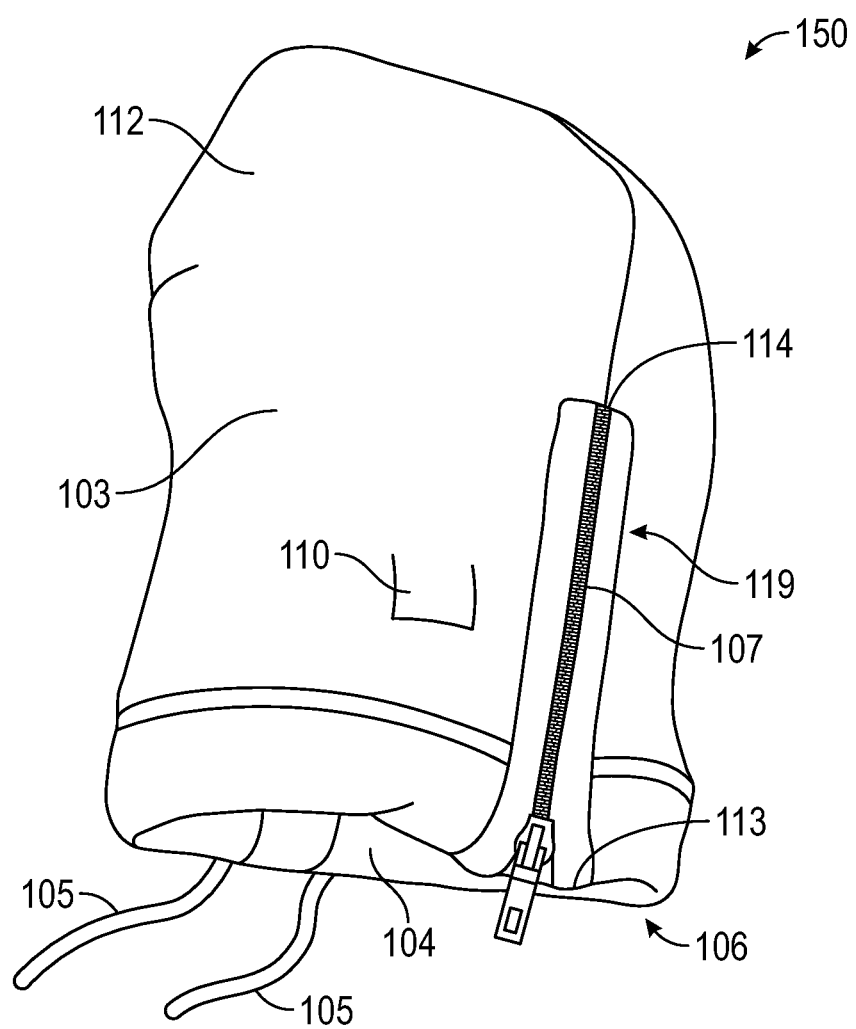
FIG. 1B shows a rear perspective view of the embodiment of the casing of FIG. 1A.

FIG. 1B illustrates a rear perspective view of casing 150. As illustrated, covering 103 may include one or more access openings 119 to allow a user to view or interact with various controls, interfaces or displays on camera 130. As illustrated, access opening 119 may further include access mechanism 107 for securing access opening 119. At least one access opening 119 may be arranged anywhere in covering 103, but in the illustrated embodiment, access opening 119 is arranged on a rear surface 112 of covering 103, or a side of covering 103 opposite front face 100. Further access openings 119 may be provided to allow an extended battery, battery pack, or cord for charging from an external battery access to camera 130 that is stored within casing 150.

Access mechanism 107 may include a zipper, elastic gathers, buttons, snaps, drawstrings, flaps, Velcro™ flaps, latches, or any one of a wide variety of other methods used for opening and closing the various pockets, pouches, and other openings on casing 150. Access mechanism 107 is shown to extend from a first point 113 located at service opening 104 to a second point 114, illustrated at a midway point on rear surface 112 of covering 103. However, first point 113 and second point 114 may also be arranged in other locations on covering 103 and need not start or terminate at service opening 104. Access opening 119 may be arranged on covering 103 such that it is an opening independent from service opening 104. Access mechanism 107 is shown in FIG. 1B to be embodied as a zipper, in a zipped or closed state, with both sides of covering 103 being united in the back where access mechanism 107 is zipped together. Although access mechanism 107 is not visible in FIG. 1A, it can also be understood that casing 150 of FIG. 1A is also shown in a state with access mechanism 107 closed.

In an alternative embodiment, access opening 119 and access mechanism 107 may be omitted and a user may access the inside of casing 150 by either flipping covering 103 inside out or stretching the material.

Furthermore, in an embodiment, covering 103, as shown in FIG. 1A and FIG. 1B, is constructed in a shape and design that resembles a hood, as in from a hooded sweatshirt, although covering 103 may be provided in any number of shapes sizes designs constructions or appearances and is not limited to that of a hood or hooded shape. Casing 150 of FIG. 1A also illustrates at least two hood seams 108 running diagonally from the bottom corners of the front face 100 to base 106 of covering 103. It can be understood that the hood seams 108, along with the front face 100, have a resemblance to that of a hooded sweatshirt, or persons face inside a hooded sweatshirt, with the hood seams 108 resembling the brim of a hood and neck down toward the collar, and the front face 100 resembling a person's face nestled inside the hood.

Figure 1C:
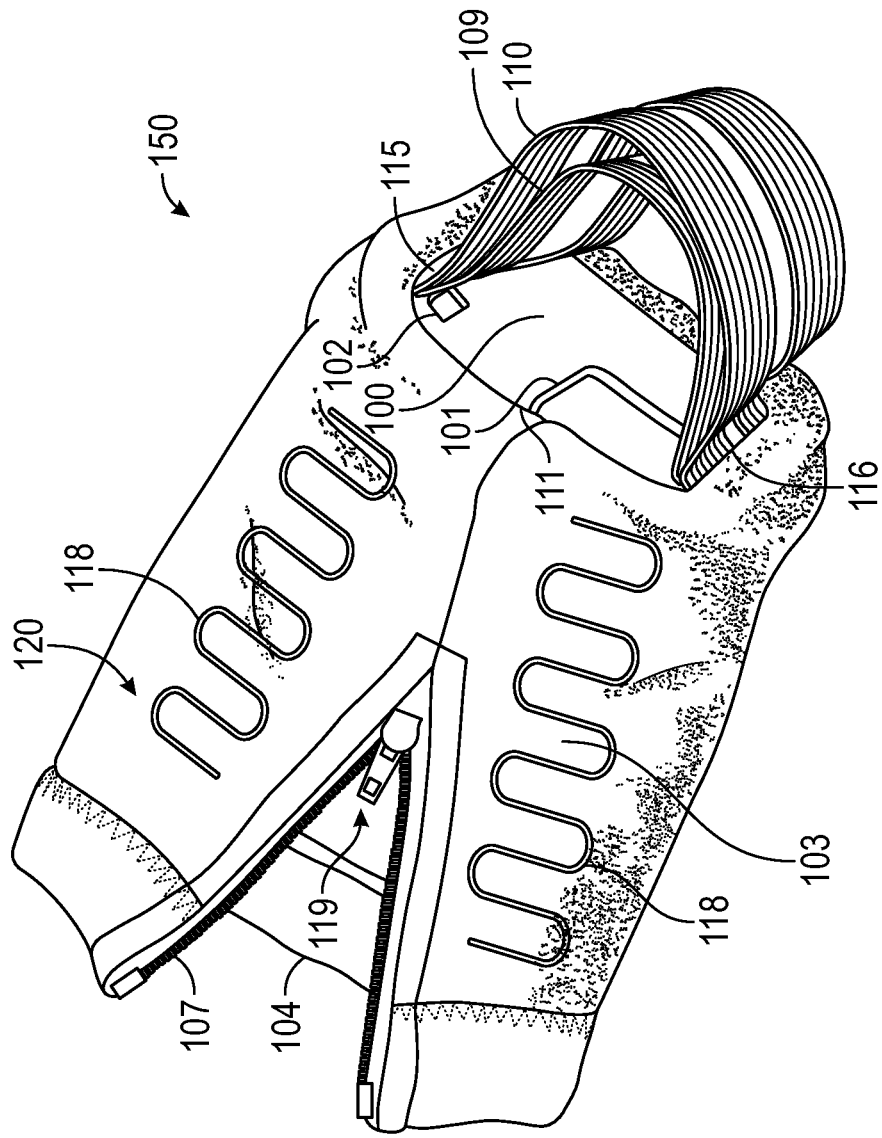
FIG. 1C shows an embodiment of a rear perspective view of the interior of the casing shown in FIGS. 1A-1B.
Figure 1D:
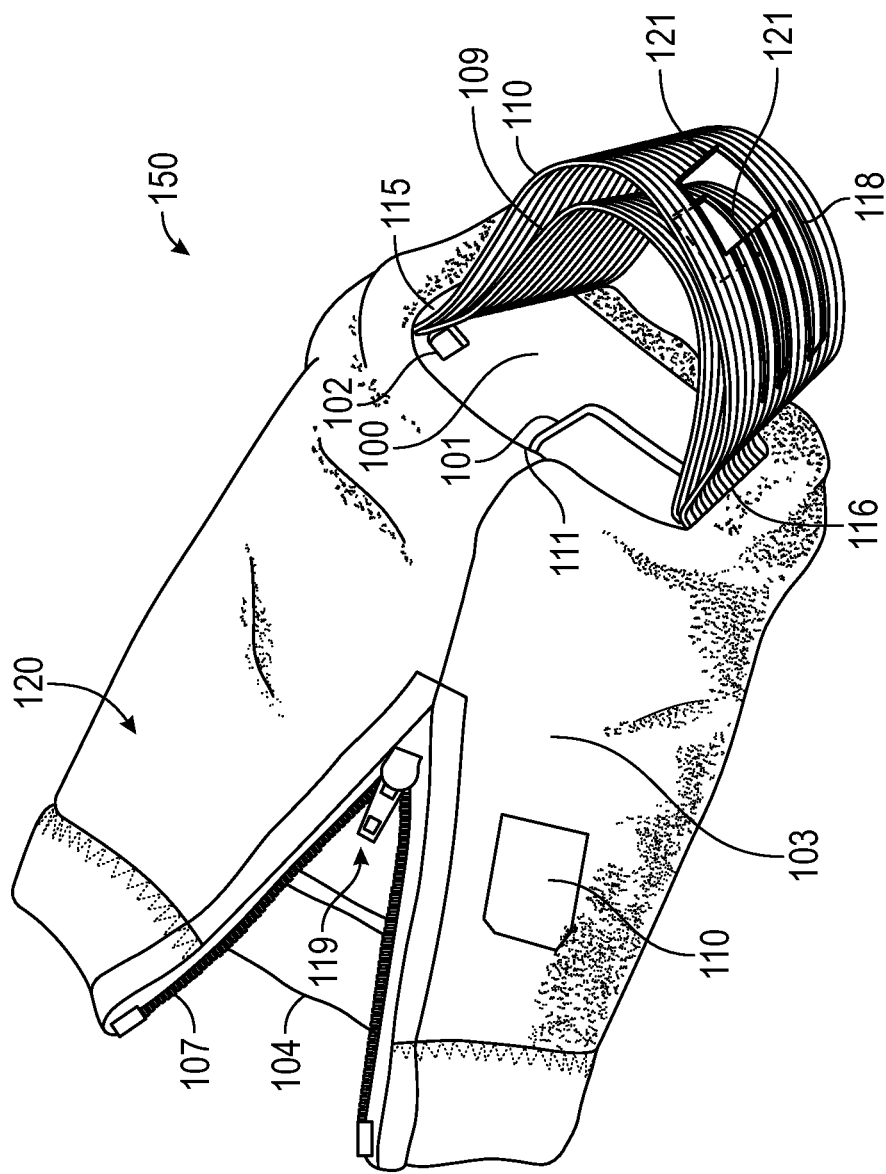
FIG. 1D shows an embodiment of a rear perspective view of the interior of the casing shown in FIGS. 1A-1B.

FIGS. 1C-1D provides a rear perspective view of casing 150 illustrated with covering 103 flipped inside out to show interior 120 of casing 150. Furthermore, access mechanism 107 is shown in FIGS. 1C-1D in an unzipped state, allowing more room for covering 103 to be opened and/or flipped inside out. Front face 100 is configured to hold camera 130 in alignment with first opening 101 with the use of either a retaining feature, such as a first retaining member 109, and/or from the fit created between camera 130, covering 103, and front face 100.

In the embodiments illustrated in FIGS. 1C and 1D, front face 100 has first retaining member 109 attached in at least a first location 115 and a second location 116 on opposing sides of front face 100. First location 115 and second location 116 may be arranged directly on front face 100 or adjacent to front face 100 on covering 103. Although first location 115 and second location 116 are arranged on the sides of front face 100, first location 115 and second location 116 may alternatively, or additionally, be arranged on the top and the bottom of front face 100. First retaining member 109 is shown in FIGS. 1C-1D as a stretchable band, such as elastic, that spans horizontally behind front face 100, creating a loop with front face 100, where camera 130 can be held between front face 100 and first retaining member 109. In a further embodiment of casing 150, the first retaining member 109 may be affixed to, embedded, or incorporated into covering 103 or between one or more layers thereof. It should be understood that first retaining member 109 may also be presented as at least one of a sleeve, strap(s), loop(s), snapping feature, Velcro™ strap, holding device, pouch, zippered pouch, pocket or any one of a wide variety of other shapes, sizes, forms, designs or constructions so long as it is capable of retaining camera 130 inside casing 150 and allowing lens 140 of camera 130 to align with and/or fit through first opening 101.

Figure 1E:
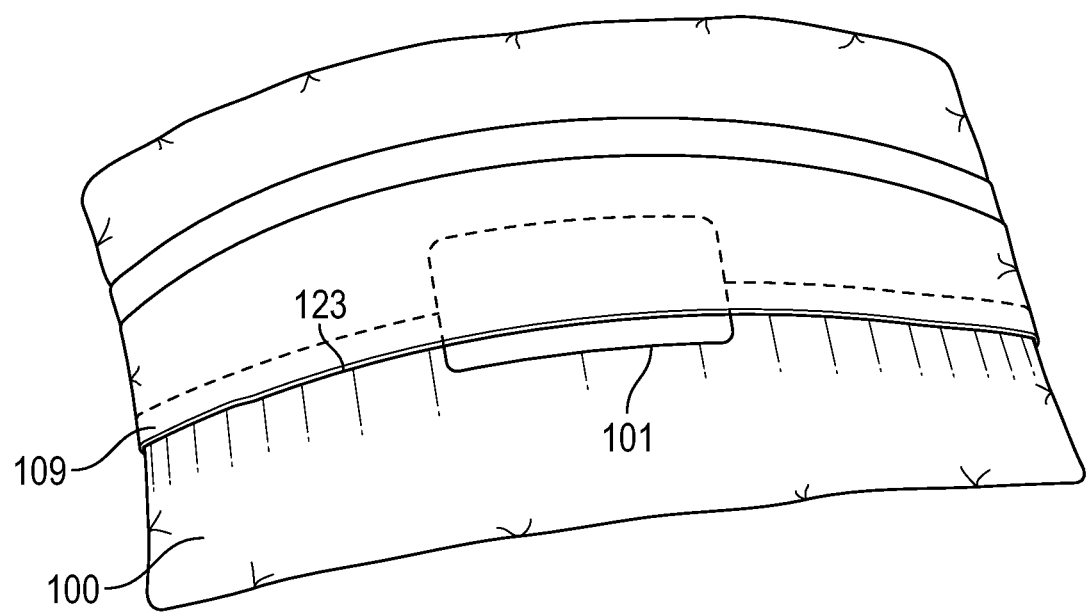
FIG. 1E shows an embodiment of a first retaining member of the casing of FIG. 1A.
Figure 1F:
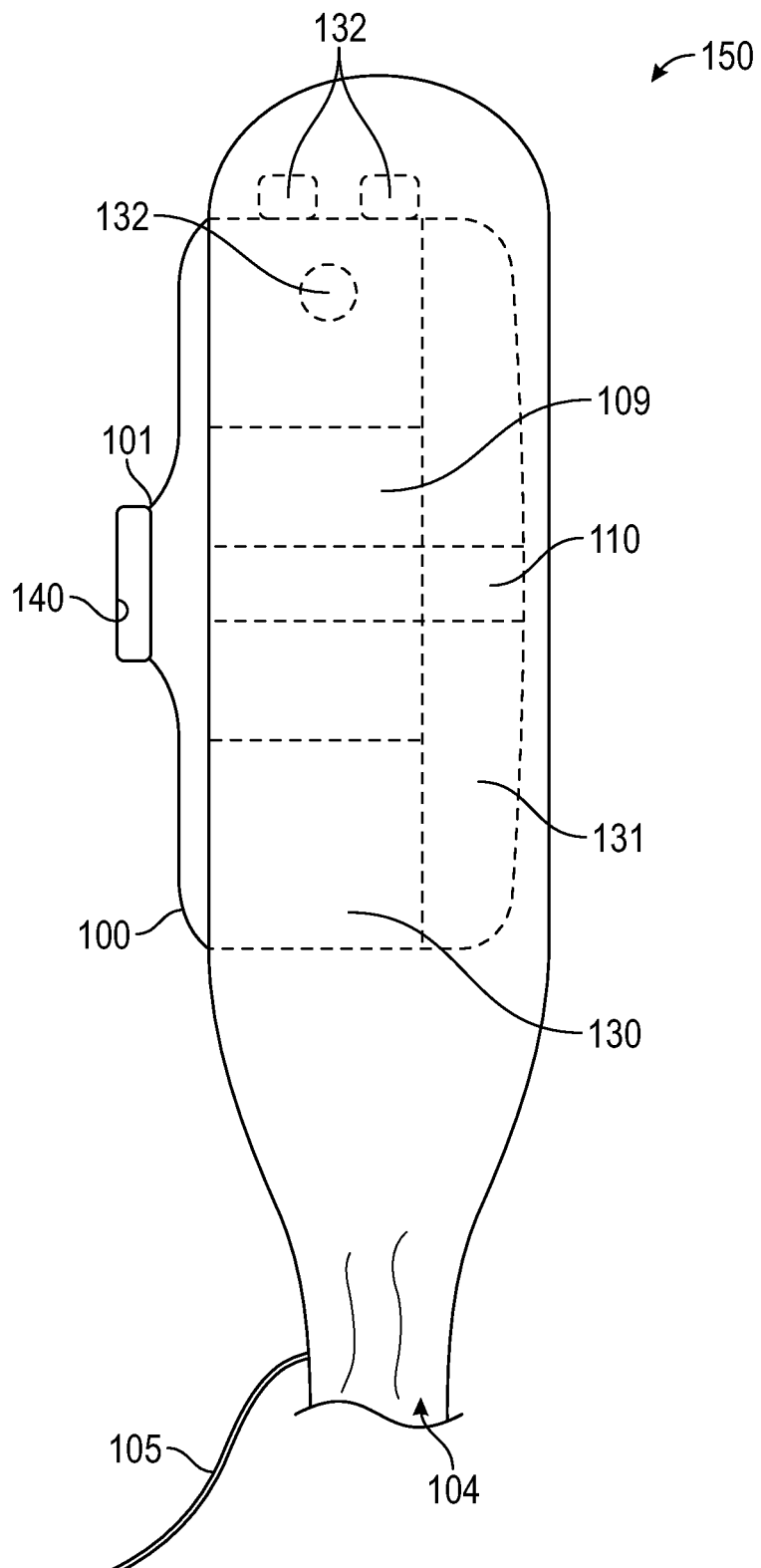
FIG. 1F shows a side view of the embodiment of FIGS. 1A-1D with a camera.

First retaining member 109 may be designed and arranged in a way so not to obstruct or block one or more camera features 132 (illustrated in FIG. 1F). Camera features 132 may include ports, buttons, or screens on the top, side and or the back of camera 130. In one embodiment, illustrated in FIG. 1C, first retaining member 109 is configured as two narrow bands that wrap around the upper edge and the lower edge of the back of camera 130 such that a Liquid Crystal Display (LCD) screen on the back of camera 130 is not blocked, nor are ports or camera features 132, on the sides of camera 130. In another embodiment, illustrated in FIG. 1D, first retaining member 109 may be configured with one or more cutouts 121 in the side and/or back of first retaining member 109. In an alternative embodiment, first retaining member 109 may be made of a clear or transparent material such that a user may interact with and/or view camera features 132 through first retaining member 109.

In a further embodiment of casing 150, front face 100 is optionally provided with at least one second retaining member 110, illustrated in FIGS. 1C-1D as a strap, which may be attached directly to front face 100 or affixed to, or incorporated into covering 103 in at least two locations on opposing sides, similar to the construction or arrangement of first retaining member 109, to retain the one or more additional accessories 131 inside casing 150. Additional accessories 131 may include a heating element, cooling element, an extended battery, battery pack and/or cord for charging from an external battery to camera 130 while camera 130 is inside casing 150. In the embodiment shown in FIGS. 1C-1D, opposing ends of second retaining member 110 is secured to first location 115 and second location 116.

Second retaining member 110, as shown in FIG. 1C-1D, is embodied as an elastic band that spans horizontally behind first retaining member 109, creating a loop with first retaining member 109 where one or more additional accessories 131 may be held. Second retaining member 110 may be configured as a single band or as illustrated in FIG. 1C, a split band such that a viewing window of camera 130 may be accessed and viewed. In another embodiment, illustrated in FIG. 1D, second retaining member 110 is embodied as a single band with one or more cutouts 121 that may be used as a viewing window. In a further embodiment of casing 150, the second retaining member 110 may be affixed to, embedded, or incorporated into covering 103 or between one or more layers thereof. It should be understood that casing 150 may also be presented to include additional second retaining members 110 such as a sleeve, straps, loops, snapping feature, Velcro™ strap, holding strap, pouch, zippered pouch, pocket or any one of a wide variety of other shapes, sizes, forms, designs or constructions, so long as it is capable of retaining one or more additional accessories 131 within, or on, casing 150.

Casing 150 may include a plurality of second retaining members 110 and each second retaining member 110 may take different forms. By way of non-limiting example, as illustrated in FIG. 1D, one second retaining member 110 may be a strap and another second retaining member 110 may be embodied as a pouch affixed or incorporated into to the inside of covering 103 that can retain extra batteries to keep them warm and/or hold a battery that is plugged into camera 130.

As with first retaining member 109, second retaining member 110 may also be embodied as a clear or transparent material which would allow a user to view or interact with camera 130 through transparent, pressure sensitive material first retaining member 109 and second retaining member 110.

One or more additional accessories 131, such as a heating element, may be considered to be any device or object capable of giving off heat and can be provided in a wide variety of conventional forms including, but not limited to: chemical heating elements, electrical heating elements, or fuel powered heating elements. Heating elements of a certain shape, design, or construction can be provided to fit inside casing 150, or alternatively, heating elements of a wide variety of shapes, designs, and constructions can fit inside. Heating elements may be provided with casing 150 or presented as a consumable. One such example of heating elements that may be used with casing 150 are chemical, oxygen activated packets that are commonly used for hand and foot warmers. Another example of heating elements is one or more rechargeable heating elements that may be inserted into casing 150 as described above. Additionally, one or more additional accessories 131 may be presented as a cooling element, which can be presented in a number of conventional forms, or by way of a non-limiting example as a freezer cooled gel pack or ice pack. An embedded heating or cooling element 118 may also be permanently built or integrated into casing 150. Embedded heating or cooling element 118 may be sewn into covering 103 between layers or in a pouch, as illustrated in FIG. 1C. Additionally or alternatively, embedded heating or cooling element 118 may also be sewn into first retaining member 109 and/or second retaining member 110, as illustrated in FIG. 1D.

FIG. 1E illustrates an alternative embodiment illustrating first retaining member 109 and front face 100. In the illustrated embodiment, second retaining member 110, as described in other embodiments, is incorporated together with first retaining member 109 as a single feature or component. By way of a non-limiting example, first retaining member 109 may be embodied as a folded over band, where additional accessories 131 may be held within a fold 123 of first retaining member 109. Alternatively, first retaining member 109 may include a secured pouch to contain additional accessories 131.

In an alternative embodiment, in lieu of second retaining member 110, one or more additional accessories 131 may be retained by covering 103 itself. In this and other alternative embodiments, closure 105, for partially or completely closing service opening 104, may be provided to improve the retention of not only camera 130 but also the additional accessories 131 inside covering 103.

FIG. 1F illustrates a side view of casing 150, as described with FIGS. 1A-1E with camera 130 inserted between front face 100 and first retaining member 109. Lens 140 of camera 130 is arranged through first opening 101 of front face 100. First retaining member 109 is shown to be stretched around camera 130 securing camera 130 to front face 100. Further, additional accessories 131 are shown to be inserted between first retaining member 109 and second retaining member 110. Second retaining member 110 is stretched around additional accessories 131 securing additional accessories 131 against first retaining member 109. In the illustrated embodiment, closure 105 is shown to substantially close service opening 104, further securing camera 130 and additional accessories 131 within casing 150.

Camera features 132, such as displays, buttons and/or controls, arranged on top, bottom, back or sides of camera 130 may be accessed by pushing through covering 103 to apply pressure to controls, or stretching covering 103 sufficiently to access camera features 132.

With covering 103 pulled over camera 130, casing 150 may reduce the rate of heat that dissipates out into the natural external environment, both from supplementary heating sources and from camera 130 itself, and thus provide insulation from cold external temperatures and weather. Casing 150 may also help trap heat inside that is generated either from camera 130 itself, or from the heating elements that can optionally be packed inside. Additionally or alternatively, the casing 150 can keep the camera 130 cool when external temperatures are very warm. The ability to provide improved insulation and heat retention within casing 150 can extend battery life and functionality of camera 130 by reducing its exposure to cold temperatures which can have an adverse effect on battery life and performance.

Figure 1G:
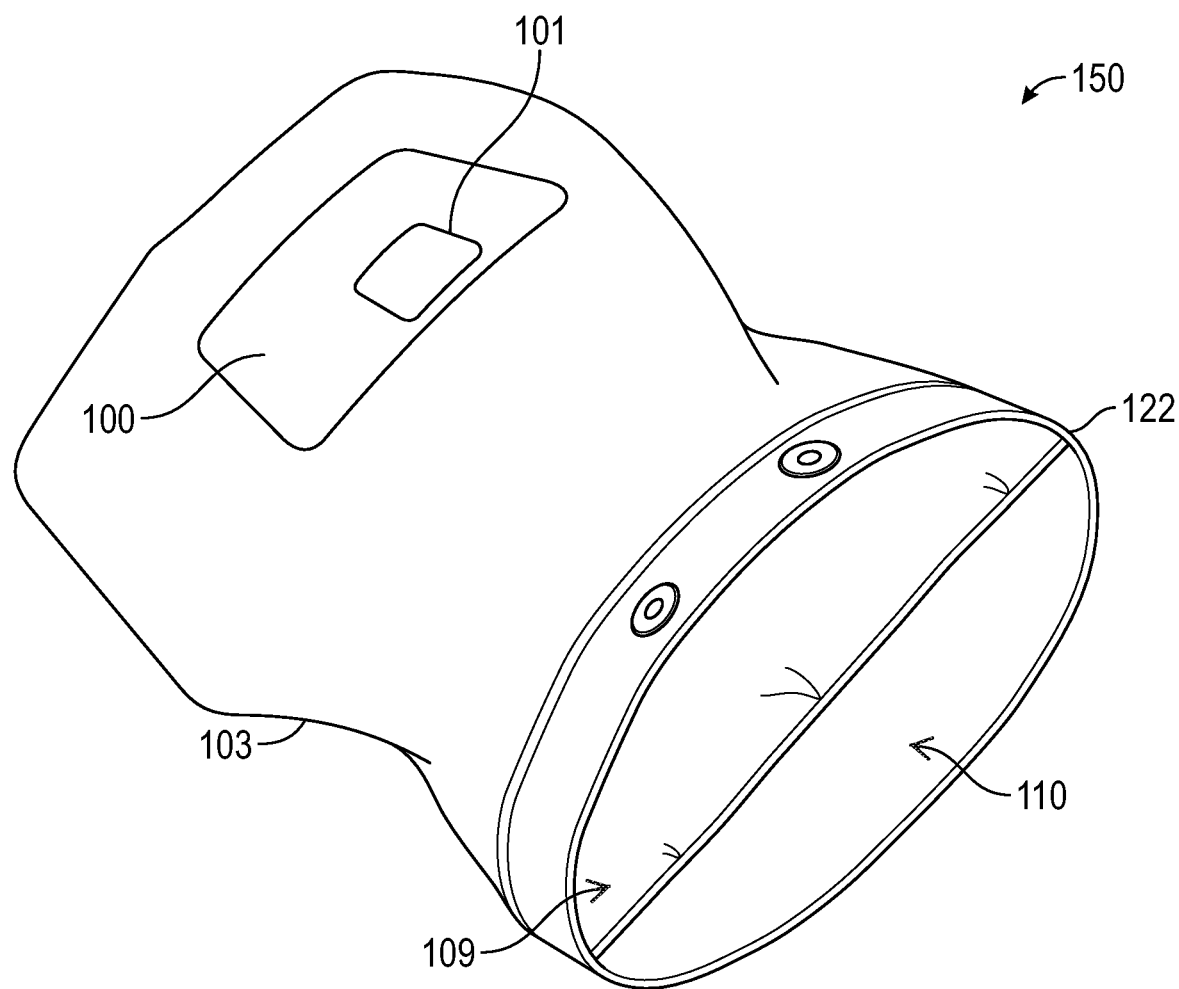
FIG. 1G shows an embodiment of a perspective view of the embodiment of the casing of FIG. 1A.

FIG. 1G illustrates a perspective view of an alternative embodiment of interior of casing 150 shown in FIG. 1A which uses a tightly fitting covering 103 to aid in holding camera 130 in place. Covering 103 may be constructed in such a way that covering 103 itself functions as first retaining member 109. The fit of camera 130 within casing 150 acts to hold camera 130 within casing 150. Covering 103 may be configured such that it fits tightly around camera 130 holding camera 130 tightly against front face 100. Further, first retaining member 109 may be configured as an opening in a lining 122 of covering 103 such that lining 122 fits tightly around camera 130. Additional accessories 131 may be included within covering 103 between lining 122 in an opening on the side of the lining 122 opposite camera 130, which may be considered as second retaining member 110. Thus, lining 122 is arranged to separate first retaining member 109 and second retaining members 110 within casing 150. Further, such casing may take the appearance of a stuffed animal or toy. Many other appearances, designs, and constructions can also be presented.

In the embodiment illustrated in FIG. 1A-1G casing 150 is designed to look like a hood, as from a hooded sweatshirt, with front face 100 resembling the opening for a face, or a human face and covering 103 resembling a hood surrounding the face and keeping it warm. Casing 150 could also be made smaller, having a tighter fit with camera 130 to be loaded inside.

Figure 2A:
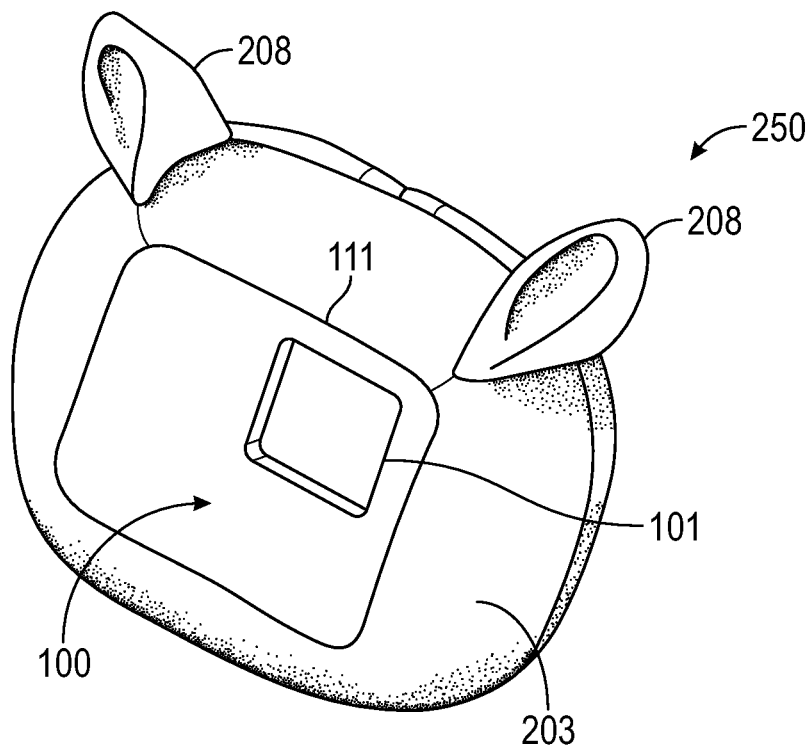
FIG. 2A shows a front perspective view of an embodiment of a casing.

FIG. 2A provides a perspective view of another embodiment illustrating a casing 250 that is designed in such a way to look like a stuffed toy resembling a bear or animal, although it can be offered in any number of shapes, sizes, designs, constructions, or appearances. Front face 100 and first opening 101 are presented in this embodiment of casing 250 of FIG. 2A-2C in a similar fashion to other embodiments already described.

Covering 203, illustrated in FIG. 2A, is attached around perimeter 111 of front face 100. In this embodiment, covering 203 is shaped to look like an animal face. Covering 203 is sewn and stuffed with cotton, batting, or other materials to give it different shapes, but also provide a secure and tight fit for camera 130, and optionally any additional accessories 131, such as a heating element (as illustrated in FIG. 2C). In this embodiment, covering 203 is designed and stuffed in a way to resemble an animal, having two animal ears 208 incorporated at the top in two places. Other features may also be included to change or enhance the appearance in a wide variety of different ways. In an alternative embodiment of casing 250, covering 203 does not include stuffing but instead is configured with a fit that is tight around camera 130 and the tight fit aids in holding camera 130 within casing 250.

Figure 2B:
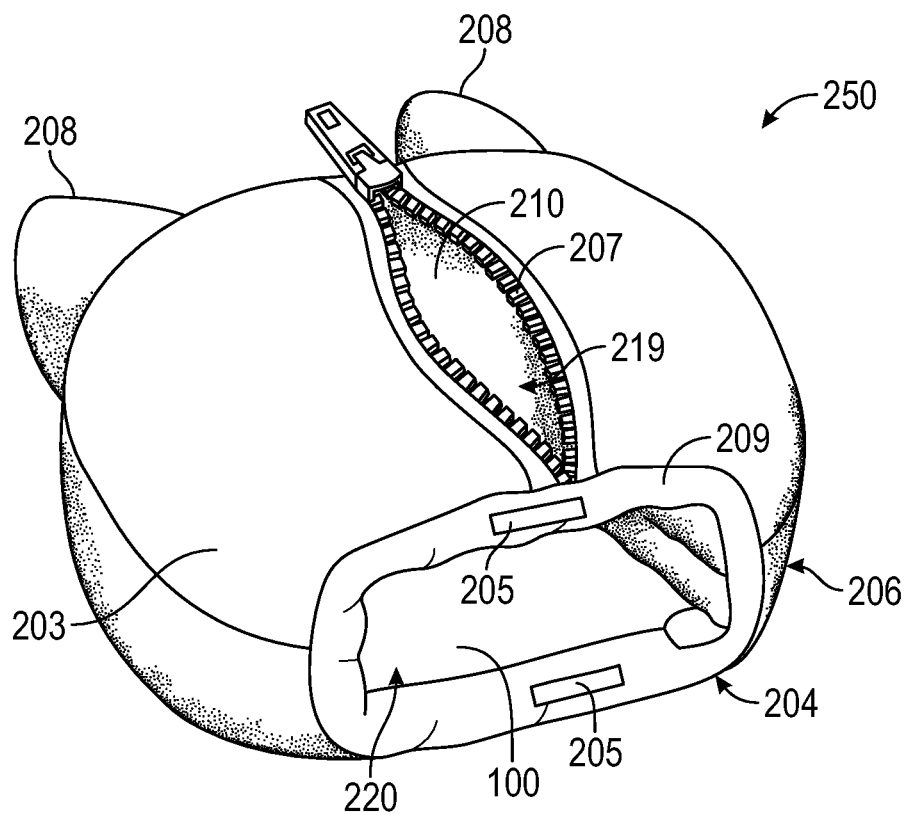
FIG. 2B shows a rear perspective view of the embodiment of the casing of FIG. 2A.
Figure 2C:
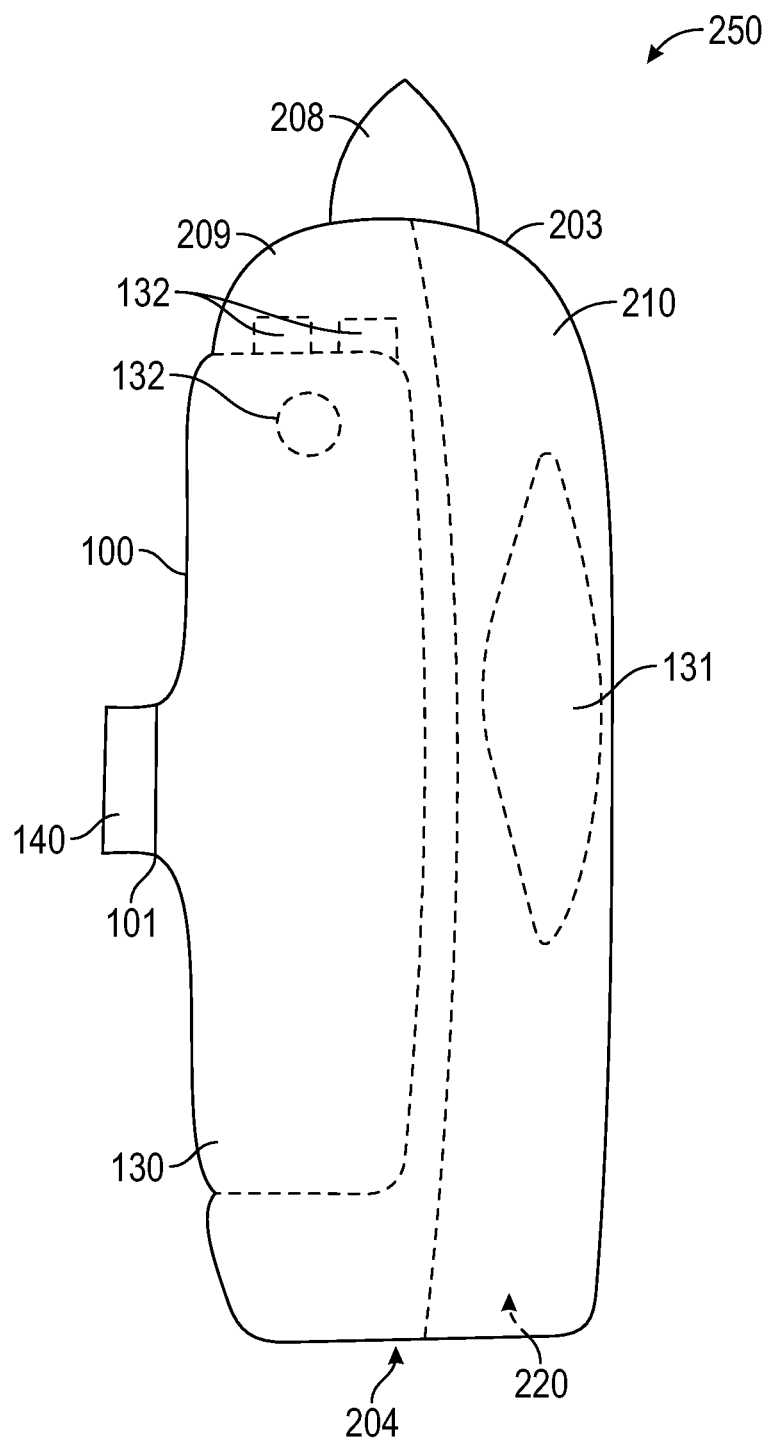
FIG. 2C shows a side view of the embodiment of the casing of FIGS. 2A-2B.

FIG. 2B provides a rear perspective view of casing 250. This embodiment of casing 250 shows that there is a first retaining member 209 incorporated in covering 203 that fits camera 130 inside (illustrated in FIG. 2C). First retaining member 209 aids in holding camera 130 in place on the front face 100 and allows lens 140 to align with first opening 101. In the illustrated embodiment, first retaining member 209 is presented as a pouch for retaining camera 130 inside an interior 220 of covering 203. A service opening 204 arranged at a bottom 206 of covering 203 is opened for the loading or unloading of camera 130 into first retaining member 209. Service opening 204 may also be utilized for mounting camera 130, which has been arranged in casing 250, to an external mount or selfie stick attached to the base of camera 130.

It should be understood that first retaining member 209 may be provided in many different shapes, sizes, forms, designs, or constructions so long as it is capable of retaining camera 130 in interior 220 of casing 250 and allowing lens 140 of camera 130 to align with, or fit through, first opening 101.

In a further embodiment, covering 203 may also include a closure 205 for completely, or partially, closing service opening 204, or the illustrated open bottom, of casing 250. Closure 205 may include elastic gather, drawstring, zipper, zippered flap, flaps, straps or any one of a wide variety of other methods or features for improving the retention of camera 130 within casing 250

In a further embodiment of FIG. 2B, casing 250 also optionally includes a second retaining member 210 incorporated in any location on or in covering 203. Second retaining member 210 is able to hold one or more additional accessories 131, such as a heating element, and is presented as a separate pocket from first retaining member 209.

Second retaining member 210 may include one or more openings 219 arranged on the exterior of casing 250 or the interior of casing 250. Opening 219 is secured using a fastener 207, shown in FIG. 2B as a zipper in an open, unzipped state. When open, fastener 207 offers access to second retaining member 210. When fastener 207 is closed, it retains additional accessories 131 within second retaining member 210. A plurality of opening 219 may be provided that allow an extended battery, battery pack, or cord for charging from an external battery to be attached to camera 130 that is stored within casing 250. Although opening 219 is shown to be arranged on the exterior of casing 250, opening 219 may also be arranged within covering 203 and accessed through service opening 204.

Although fastener 207 is shown as a zipper in FIG. 2B, fastener 207 may also be comprised of elastic gathers, buttons, snaps, drawstrings, flaps, Velcro™ flaps, latches, or any one of a wide variety of other methods for opening and closing the various pockets, pouches, and other openings on casing 250. It should be understood that second retaining member 210 may be provided in many different shapes, sizes, forms, designs, or construction so long as it is capable of retaining one or more additional accessories 131, such as a heating element, within, or on, casing 250. In the embodiment illustrated in FIG. 2A-2B, camera 130 and additional accessories 131 are in separate retaining areas.

In an alternative embodiment, first retaining member 209 is arranged in covering 203 such that first retaining member 209 holds camera 130 along with additional accessories 131, such as heating element. Thus, camera 130 and additional accessories 131 are retained in the same area.

FIG. 2C illustrates a side view of casing 250 with camera 130 inserted into interior 220 of covering 203 in first retaining member 209, embodied as a pouch or a compartment, such that it is fitted with front face 100. Stuffing of covering 203 aids in holding camera 130 to front face 100 and maintaining a tight fit against front face 100. Lens 140 is arranged through first opening 101 of front face 100. Further, additional accessories 131 is shown to be arranged in second retaining member 210, illustrated as a pouch or compartment in covering 203. In the illustrated embodiment camera 130 and additional accessories 131 are separated by different retaining members. However, in an alternative embodiment, camera 130 and additional accessories 131 may share first retaining member 209.

Figure 3A:
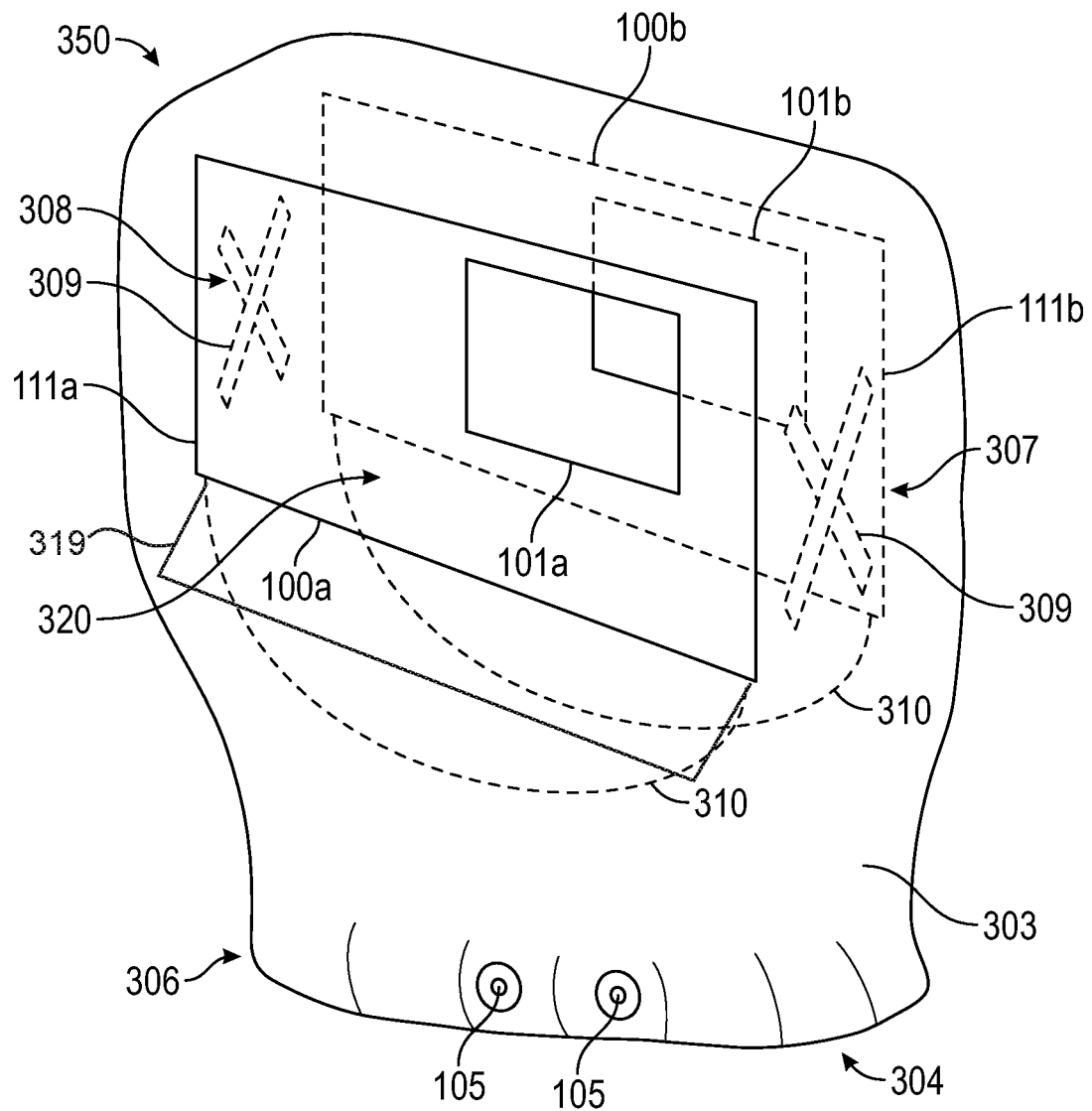
FIG. 3A shows a front perspective view of an embodiment of a casing.
Figure 3B:
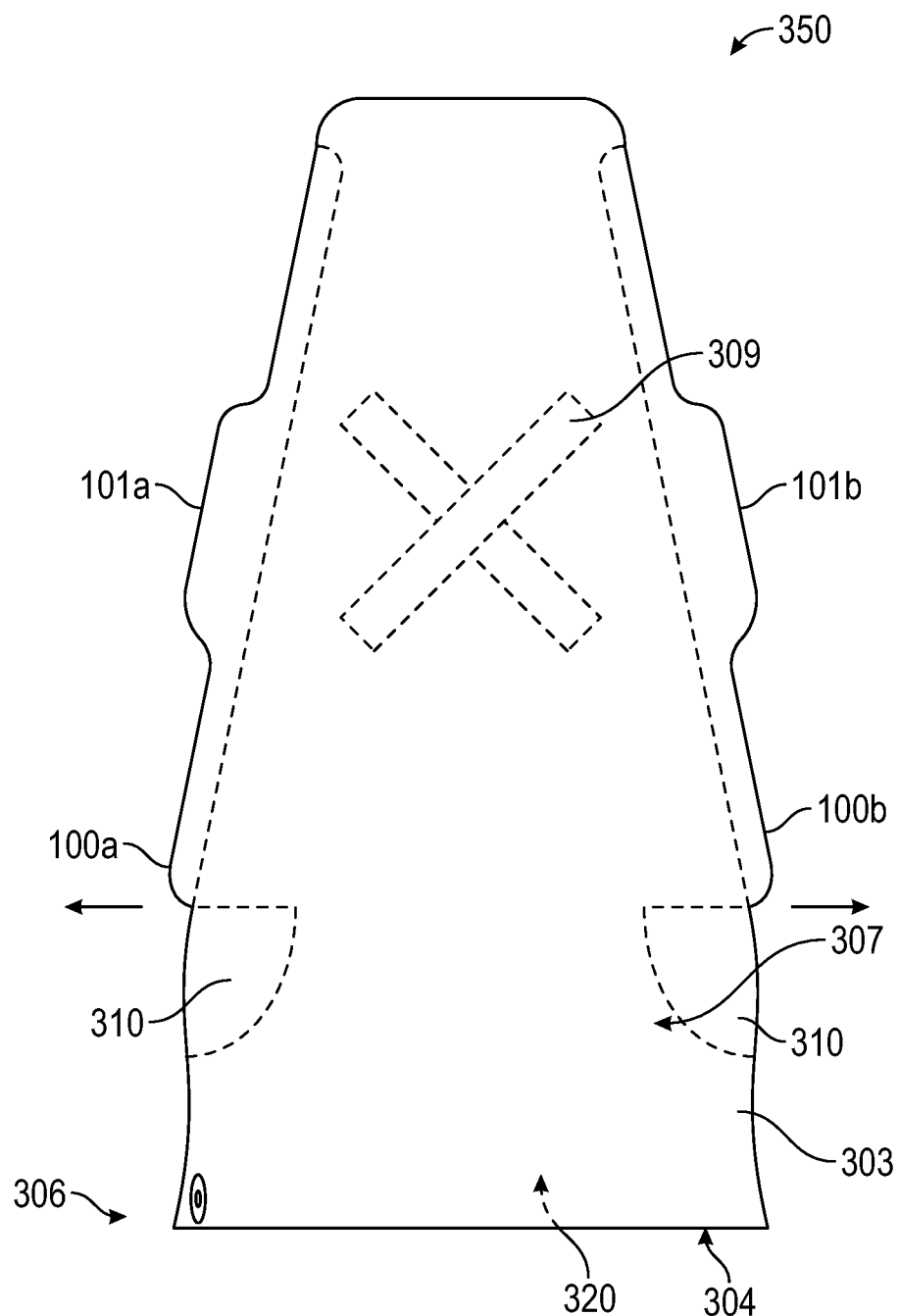
FIG. 3B shows a side view of the embodiment of the casing of FIG. 3A.
Figure 3C:
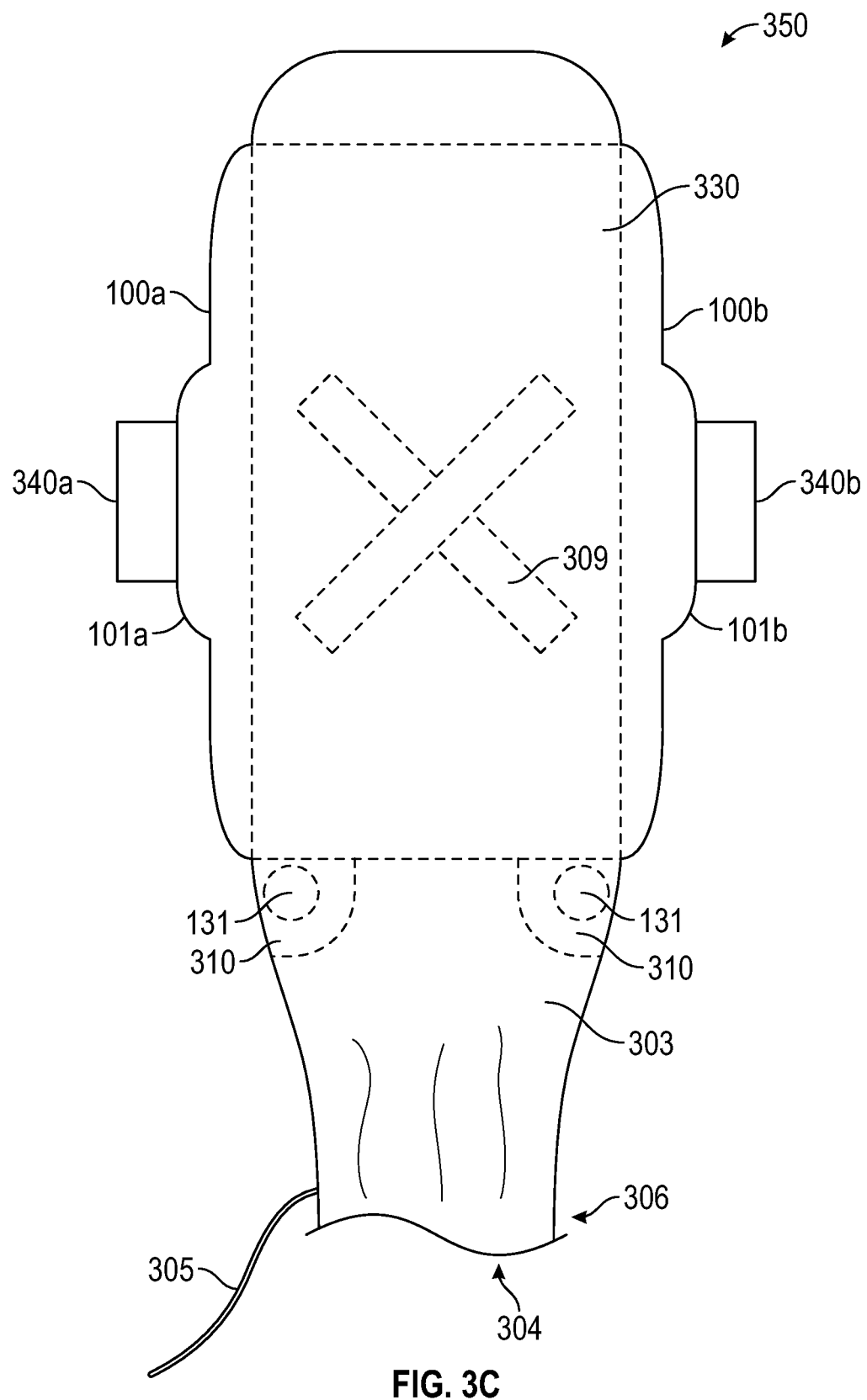
FIG. 3C shows a side view of the embodiment of the casing of FIG. 3A.

In another embodiment, illustrated in FIGS. 3A-3C, a casing 350 is configured to have a plurality of front faces. FIG. 3A shows a perspective view of casing 350 having a first front face 100a and a second front face 100b. Each front face 100a, 100b may include all of the features of front face 100, shown and described in earlier embodiments, including at least a first opening 101a on first front face 100a and a first opening 101b on second front face 100b. This arrangement of at least two front faces 100a, 100b is advantageous for use with a camera 330 (illustrated in FIG. 3C). Camera 330 may be embodied with a plurality of lenses 340a, 340b.

Each front face 100a, 100b is arranged on opposite sides of a covering 303. Covering 303 may include all of the features shown and described in earlier embodiments. In FIG. 3A-3C covering 303 is shown to be attached around a perimeter 111a, 111b of each front face 100a, 100b. Camera 330 is arranged between each front face 100a, 100b by using a first retaining member 309. In the illustrated embodiment, first retaining member 309 is a tension applying element arranged on a first side 307 and/or a second side 308 between each front face 100a, 100b in an interior 320 of covering 303 and/or incorporated within the covering 303.

First retaining member 309 pulls first front face 100a and second front face 100b towards each other. Thus, when camera 330 is placed between each front face 100a, 100b camera 330 is held in place, not only by the fitting of each front face 100a, 100b with a feature of camera 330, such as lenses 340a, 340b through at least first openings 101a, 101b, but also the tension placed on camera 330 from first retaining member 309 pulling each front face 100a, 100b together.

Optionally, one or more second retaining member 310 may be included in casing 350. Second retaining member 310 may be configured as any of the above-mentioned embodiments arranged on or in covering 303. In the illustrated embodiment, one or more second retaining member 310 is arranged below each front face 100a, 100b and configured as a pouch for holding additional accessories 131 (illustrated in FIG. 3C) such as heat packs, batteries or other accessories mentioned with other embodiments. Second retaining member 310 may be accessed through an optional one or more access feature 319, illustrated as a flap in FIG. 3A. Access feature 319 offers access to interior 320 of casing 350. Additionally or alternatively, at least one access feature 319 offers access to second retaining member 310. Additionally or alternatively, access feature 319 may be embodied similar to access opening 119 and access mechanism 107.

FIG. 3B illustrates a side view of casing 350. Interior 320 of casing 350 is prepared for inserting camera 330 by separating front faces 100a, 100b such that first retaining member 309 and covering 303 are stretched, as illustrated by the arrows. In a relaxed state, or covering 303 being in an unstretched state, the space between each front face 100a, 100b is less than the width of camera 330. When preparing casing 350 for camera 330, covering 303 is stretched such that the space between each front face 100a, 100b is greater than the width of camera 330 to allow for insertion of camera 330.

FIG. 3C illustrates a side view of casing 350 with camera 330 inserted into casing 350. Camera 330 is configured to be inserted at a base 306 through a service opening 304 and held in place by a combination of each lens 340a, 340b being aligned with each of the first opening 101a, 101b. Tension from front faces 100a, 100b applied on either side of camera 330 at least partially holds camera 330 in place. The space between each front face 100a, 100b with loaded camera 330 is substantially similar to the width of camera 330.

In a further embodiment, a closure 305 may be provided to further secure camera 330 within casing 350. Closure 305 may be similar to closure 105 described with the embodiment illustrated in FIGS. 1A-1D and 1F. Closure 305 may be further for securing camera 330 within casing 350 by at least partially closing service opening 304 preventing camera 330 from being inadvertently removed from casing 350.

Figure 4:
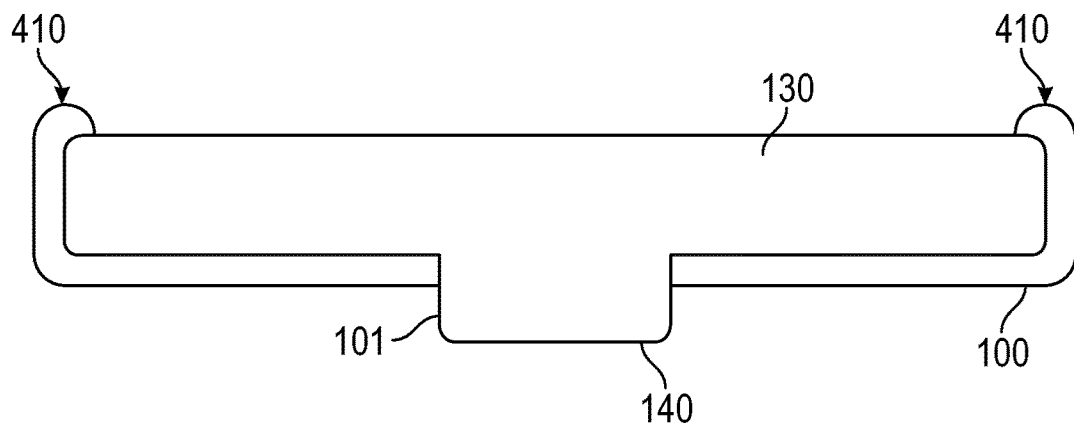
FIG. 4 shows a schematic of an embodiment of the fitting between a front face of casing and a camera.

FIG. 4 illustrates a top view schematic of one embodiment of the fit between camera 130 and front face 100 having a snap fit. Front face 100 includes a snapping feature 410 arranged on opposite sides of front face 100 that snaps or holds camera 130 into place against front face 100, securing camera 130 in position. Snapping feature 410 may be arranged on the sides of front face 100, as illustrated, and/or at the top and bottom of front face 100 such that snapping feature 410 may be arranged on two sides of front face 100 or around the perimeter of front face 100, i.e. four sides. Snapping feature 410 may be configured to extend up to the rear portion of camera 130.

In the illustrated embodiments, camera 130, 330 is held in place within casing 150, 250, 350 by at least one of: the direct fit between front face 100, 100a, 100b and camera 130, 330; the fit of casing 150, 250, 350 with camera 130, 330; first retaining member 109, 209, 309 fitting camera 130, 330 against front face 100; and closure 105, 205, 305 at least partially enclosing camera 130, 330 within casing 150, 250, 350.

Figure 5:
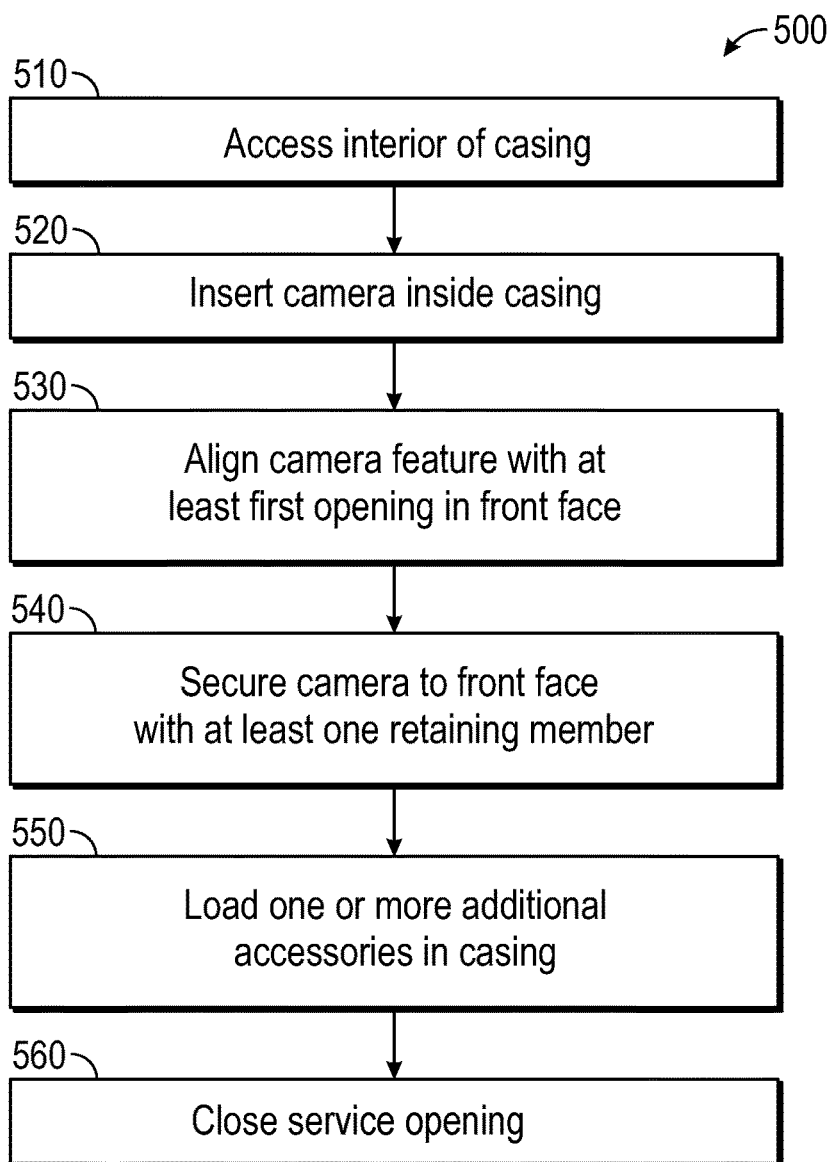
FIG. 5 shows a method of operating the casing.

FIG. 5 illustrates an embodiment for operating 500 casing 150, 250, 350. First 510, a user accesses interior 120, 220, 320 of casing 150, 250, 350 by opening service opening 104, 204, 304. The size of service opening 104, 204, 304 is increased allowing the user to open covering 103, 203, 303 and/or covering 103 is flipped partially or entirely inside out. The ability to open covering 103, 203, 303, or flip covering 103 inside out allows the user easier access to load camera 130, 330 inside casing 150, 250, 350. Furthermore, the user has easier access to camera features 132, such as controls, displays, and features, which may be located on the top, sides, bottom and back of camera 130, 330.

Second 520, insert camera 130, 330 into casing 150, 250, 350 through service opening 104, 204, 304.

Third 530, align a feature of camera 130, 330, such as lens 140, 340a, 340b, with, or fit through, first opening 101, 101a, 101b. In an embodiment, first opening 101, 101a, 101b is configured to fit, even snap, in place with lens 140, 340a, 340b. A fit may exist between lens 140, 340a, 340b and first opening 101, 101a, 101b to hold camera 130, 330 in place, reducing the likelihood of camera 130, 330 jarring loose from casing 150, 250, 350, front face 100, 100a, 100b and/or first opening 101, 101a, 101b when camera 130, 330 is jostled or jerked. The fit between lens 140, 340a, 340b and first opening 101, 101a, 101b may also align front face 100, 100a, 100b with camera 130, 330. The locating of front face 100, 100a, 100b in relation to camera 130, 330 also helps to align second opening 102 with one or more controls, displays and features on the front of camera 130, 330. This allows the user to view or interact with any of the controls, displays, and features that second opening 102 is aligned with.

Fourth 540, secure camera 130, 330 to front face 100, 100a, 100b using at least first retaining member 109, 209, 309. First retaining member 109, 209, 309 may hold camera 130, 330 to front face 100, 100a, 100b alone or work in conjunction with the fit from front face 100, 100a, 100b.

Fifth 550, load any desired additional accessories 131 into casing 150, 250, 350, such as a heating element. As discussed in various embodiments, a user who wishes to load additional accessories 131 into casing 150, 250, 350 may secure additional accessories 131 in casing 150, 250, 350 using at least one second retaining member 110, 210, 310 or by loading additional accessories in covering 103, 203, 303.

Sixth 560, close covering 103, 203, 303 and/or flip covering 103 back over camera 130 and optionally fasten service opening 104, 204, 304 using closure 105, 205, 305. With service opening 104, 204, 304 fastened, it can be understood that camera 130, 330 stored within would be partially or completely covered by covering 103, 203, 303 and front face 100, 100a, 100b, offering protection and insulation for camera 130, 330.

Optionally mounting camera 130, 330 to a mount or a selfie stick through service opening 104, 204, 304. Closure 105, 205, 305 may be secured around the mount.

It can be understood that heat is generated inside casing 150, 250, 350 from the work being performed by the camera's internal electronics and batteries, and/or from one or more heating elements loaded inside. It can also be understood that casing 150, 250, 350 insulates camera 130, 330 from cold outside temperatures while also reducing the rate at which heat is dissipated from the inside of casing 150, 250, 350 into the external environment.

The ability to retain heat within casing 150, 250, 350, as well as insulate camera 130, 330 from cold outside temperatures, is beneficial since sustained exposure to cold temperatures reduces battery functionality and life. Thus, casing 150, 250, 350 improves camera 130, 330 performance and battery life of camera 130, 330 stored within.

Additionally, while camera 130, 330 is sheltered inside casing 150, 250, 350 it is still able to record video and take photos of events happening in the external environment since lens 140, 340a, 340b of camera 130, 330 aligns with, or fits through, first opening 101, 101a, 101b. Furthermore, a user may also interact with camera features 132, such as other buttons and controls, located on the back, top, bottom, and sides of camera 130, 330 by pushing through the flexible material of covering 103, 203, 303. Commonly, the record button or power button is located on the top or sides of camera 130, 330 and the user may interact with these buttons, or camera feature 132, by pushing them from the outside of casing 150, 250, 350.

Battery life of camera 130, 330 enclosed in casing 150, 250, 350 has been shown to be improved with or without additional heating sources. Camera 130, 330 generates its own heat with features such as a high shutter speed and resolution settings. Heat generated from camera 130, 330 may be held within casing 150, 250, 350 creating a more temperature suitable environment for battery life performance. In some situations, the battery life has been shown to double.

FIG. 6 shows a performance chart 600 comparison of a camera with the above-described casing versus a camera without the casing. A test was performed with a camera where the battery was no less than 98% charged. The camera was turned on, set to the correct settings, and the record button on the camera was pushed. As soon as the camera began recording, the camera was placed into a freezer, kept at or below 0° Fahrenheit, to simulate cold temperatures. Further, a fan within the freezer was used to simulate windchill, moving hot ambient air away from the camera, cooling the camera further. The camera was left in the freezer, recording continuously until the battery died and the camera shut off. Afterwards, the recording was evaluated for the total time that the camera was able to film. The testing was performed without an external heating source for the camera and the heat generated was from the camera itself.

In a first experiment 610, the camera was set to 960 resolution, 120 frames per second (fps) and a wide view. As shown, the average recording time without a casing was 35 min but with the casing was 83 min. The camera with the casing showed a 235% improvement in the function of the camera over the camera without the casing.

In a second experiment 620, the camera was set to 1440 resolution, 60 fps and a wide view. As shown, the average recording time without a casing was 38 min but with the casing was 85 min. The camera with the casing showed a 221% improvement over the camera without the casing.

In a third experiment 630, the camera was set to 2700 resolution, 30 fps and a wide view. As shown, the average recording time without a casing was 49 min but with the casing was 86 min. The camera with the casing showed a 175% improvement over the camera without the casing.

In a fourth experiment 640, the camera was set to 4000 resolution, 30 fps and a wide view. As shown, the average recording time without a casing was 34 min but with the casing was 70 min. The camera with the casing showed a 205% improvement over the camera without the casing.

It is thus shown that a camera arranged within casing 150, 250, 350 improves the performance of the camera and the battery in cold temperatures.

In a separate test, a camera battery was charged no less than 98% charged. The camera was placed in the freezer for an amount of time and the temperature maintained at or below 1° Fahrenheit. This amount of time was predetermined and is referred to as the "cold start time" period. A fan was also placed in the freezer and was set to either an "on" or an "off" mode when during the cold start time. After the cold start time had passed, the camera was turned on, set to the correct setting and the record button was pushed. As soon as the camera began recording, it was again placed in the freezer. The camera was left in the freezer, recording continuously, until the battery died and the camera shut off. Afterwards, the recording was evaluated to obtain the total time the camera was filmed for, or the "runtime".

The camera was tested with the casing as described in the embodiments and without the casing. For tests with the casing, two hand warmer sized chemically activated heat packs arranged within the casing, as described in certain embodiments. The packs were fully activated before beginning the testing period. For tests without the casing, no heating elements were used. If the camera failed to start at all after the cold start time, it was considered to have failed the test. If the camera started and ran for any amount of time it was considered to have passed.

The camera settings were set to 4000 resolution, 30 fps and a wide view. In the tests without a casing, the camera failed in cold start times greater than 30 min when the fan in the freezer was in the "off" mode. When the fan was in the "on" mode, the camera was unable to turn on after being in the freezer for 30 min. However, with the casing and heat packs, not only was the camera able to turn on after 60 min in the freezer, with the fan both in the "on" and "off" mode, but it ran for at least 72 min. Thus, combination of the camera being arranged within the casing along with heating elements was shown to have better performance than a camera without heating elements or a casing.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A camera casing comprising:
   at least one front face comprising a first opening, the front face being configured to securely fit with a camera;
   a flexible covering attached to a perimeter of the front face, the flexible covering having a service opening to provide access to an interior of the camera casing; and
   at least a first retaining member incorporated into the flexible covering, the first retaining member configured to secure the camera to the front face.

2. The camera casing of claim 1, wherein the first retaining member is secured at a first location and a second location spaced there apart and on the front face, the first retaining member configured to hold the camera in a position relative to the front face.

3. The camera casing of claim 1, further comprising a second retaining member incorporated in the flexible covering, wherein the second retaining member is configured to hold at least one additional accessory.

4. The camera casing of claim 3, wherein one of the at least one additional accessory is a heating element or a cooling element.

5. The camera casing of claim 3, wherein the second retaining member is configured as a pocket or pouch incorporated within or affixed to the flexible covering.

6. The camera casing of claim 3, wherein the second retaining member further comprises a closure configured to partially or completely close the second retaining member enclosing the at least one additional accessory within.

7. The camera casing of claim 1, wherein the flexible covering comprises one or more layers of flexible material.

8. The camera casing of claim 7, wherein the first retaining member is incorporated within the flexible covering between the one or more layers of flexible material.

9. The camera casing of claim 1, wherein a material of the front face is different from a material of the flexible covering.

10. The camera casing of claim 9 wherein the material of the front face is comprised of a rigid or a semi-rigid material.

11. A camera casing comprising:
at least one front face comprising a first opening, the front face being configured to securely fit with a camera;
a flexible covering attached to a perimeter of the front face, the flexible covering having a service opening to provide access to an interior of the camera casing,
wherein the front face comprises a rigid or a semi-rigid material,
wherein the front face comprises one or more 3D features to correspond to one or more features of the camera for positioning the camera within the camera casing, and
wherein the material of the front face is different from a material of the flexible covering.

12. The camera casing of claim 11 wherein the front face is a molded or flat front face with the one or more 3D features corresponding to the one or more features of the camera for positioning the camera within the camera casing.

13. The camera casing of claim 11, wherein the front face further comprises one or more secondary openings, wherein the one or more secondary openings are configured to align with one or more additional features of the camera.

14. The camera casing of claim 11, wherein one or both of the front face and the flexible covering are constructed from materials having thermal properties allowing for reduced heat transfer to or from the interior of the camera casing.

15. A camera casing comprising:
at least one front face comprising a first opening, the front face being configured to securely fit with a camera;
a flexible covering attached to a perimeter of the front face, the flexible covering having a service opening to provide access to an interior of the camera casing;
at least a first retaining member arranged in the interior of the camera casing, the first retaining member configured to secure the camera to the front face; and
wherein a material of the front face is different from a material of the flexible covering; and
wherein one or both of the front face and the flexible covering are comprised of a material having thermal properties allowing for retaining heat within the camera casing or insulating the interior of the camera casing from an external environment.

16. The camera casing of claim 15, further comprising a second retaining member incorporated in the flexible covering, wherein the second retaining member is configured to hold at least one additional accessory.

17. The camera casing of claim 16, wherein the second retaining member is configured as a pocket or pouch incorporated within or affixed to the flexible covering.

* * * * *